US010498991B2

(12) United States Patent
Van Der Tempel

(10) Patent No.: US 10,498,991 B2
(45) Date of Patent: Dec. 3, 2019

(54) HIGH DYNAMIC RANGE PIXEL AND A METHOD FOR OPERATING IT

(71) Applicant: SOFTKINETIC SENSORS NV, Brussels (BE)

(72) Inventor: Ward Van Der Tempel, Keerbergen (BE)

(73) Assignee: Sony Depthsensing Solutions SA/NV, Brussels (BE)

( * ) Notice: Subject to any disclaimer, the term of this patent is extended or adjusted under 35 U.S.C. 154(b) by 322 days.

(21) Appl. No.: 15/321,434

(22) PCT Filed: Jul. 6, 2015

(86) PCT No.: PCT/EP2015/065372
§ 371 (c)(1),
(2) Date: Dec. 22, 2016

(87) PCT Pub. No.: WO2016/005332
PCT Pub. Date: Jan. 14, 2016

(65) Prior Publication Data
US 2017/0214878 A1 Jul. 27, 2017

(30) Foreign Application Priority Data

Jul. 8, 2014 (EP) .................................. 14176159

(51) Int. Cl.
*H04N 5/3745* (2011.01)
*H04N 5/355* (2011.01)
*H04N 5/378* (2011.01)

(52) U.S. Cl.
CPC ....... *H04N 5/37452* (2013.01); *H04N 5/3559* (2013.01); *H04N 5/378* (2013.01)

(58) Field of Classification Search
CPC .. H04N 5/378; H04N 5/3559; H04N 5/37452; G01C 3/08; G01J 1/46; G01J 2001/446; H01L 27/14; H01L 27/148
(Continued)

(56) References Cited

U.S. PATENT DOCUMENTS

2005/0012168 A1 1/2005 Hong
2005/0205930 A1* 9/2005 Williams, Jr. .... H01L 21/76254
257/347
(Continued)

FOREIGN PATENT DOCUMENTS

CN 201508539 U 6/2010
CN 102668017 A 9/2012
(Continued)

OTHER PUBLICATIONS

Xiangli Li: "MOSFET Modulated Dual Conversion Gain CMOS Image Sensors", Nov. 1, 2008 (Nov. 1, 2008), XP055141707, Retrieved from the Internet: <URL: http: //cmosedu.com/jbaker/students/MOSFET Modulated Dual Conversion Gain CMOS Image Sensors.pdf> [retrieved on Sep. 22, 2014].
(Continued)

*Primary Examiner* — Isam A Alsomiri
*Assistant Examiner* — Amanda J Webster
(74) *Attorney, Agent, or Firm* — Wolf, Greenfield & Sacks, P.C.

(57) ABSTRACT

The invention relates to a HDR pixel comprising a photo-sensitive element; a detector node connected to the photo-sensitive element; a reset switch connected to the detector node for resetting the detector node to a predetermined voltage; a buffer amplifier having an input connected to the detector node; a selecting transistor operable to select said pixel during a read out process; an intrinsic parasitic capacitance originated from at least one of the photo-sensitive
(Continued)

element, the detector node, the reset switch, the buffer amplifier, the selecting transistor and operable to store the minority carriers generated by the photo-sensitive element; characterized in that the pixel further comprises a dual-mode capacitance having an input connected to the detector node and being operable in storing and destoring modes, for storing the generated minority carriers while being in the storing mode and destoring the minority carriers into the parasitic capacitance, while being in the destoring mode.

7 Claims, 6 Drawing Sheets

(58) Field of Classification Search
USPC .............................................. 356/3.01–5.15
See application file for complete search history.

(56) References Cited

U.S. PATENT DOCUMENTS

| | | | | |
|---|---|---|---|---|
| 2005/0224843 | A1* | 10/2005 | Boemler | H01L 27/14603 257/233 |
| 2007/0001101 | A1* | 1/2007 | Sundararaman | H04N 3/1512 250/214 R |
| 2011/0188051 | A1* | 8/2011 | Stuck | A61J 3/007 356/511 |
| 2013/0033582 | A1* | 2/2013 | Sun | G06T 5/002 348/47 |
| 2013/0228691 | A1* | 9/2013 | Shah | H01L 27/14614 250/341.8 |
| 2014/0078381 | A1* | 3/2014 | Ovsiannikov | H04N 5/2354 348/370 |

FOREIGN PATENT DOCUMENTS

| | | |
|---|---|---|
| CN | 102740082 A | 10/2012 |
| CN | 103842842 A | 6/2014 |

OTHER PUBLICATIONS

International Search Report and Written Opinion for International Application No. PCT/EP2015/065372 dated Oct. 29, 2015.
International Preliminary Report on Patentability for International Application No. PCT/EP2015/065372 dated Sep. 7, 2016.
Chinese Office Action for Chinese Application No. 2015800336123 dated Dec. 24, 2018.

* cited by examiner

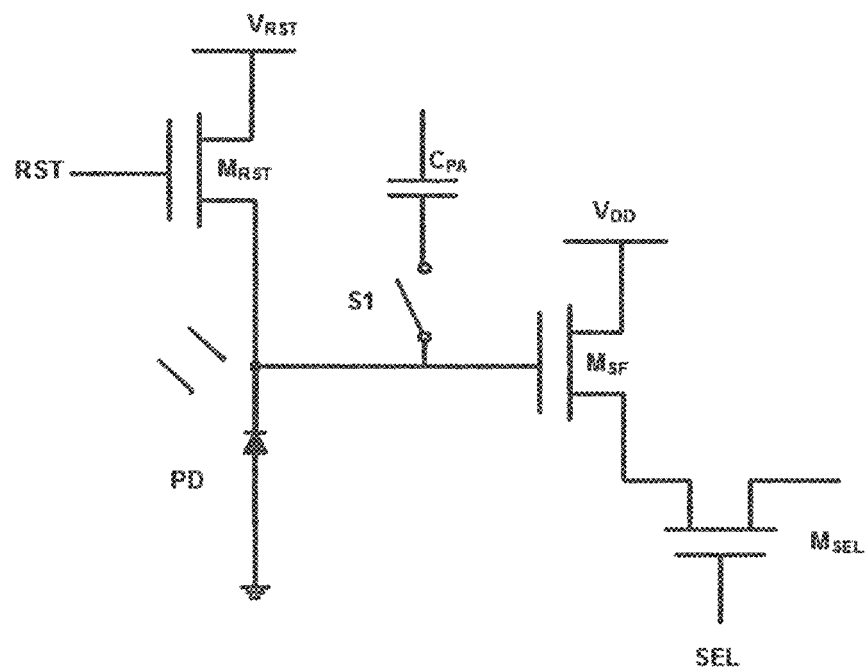
Figure 3 - PRIOR ART
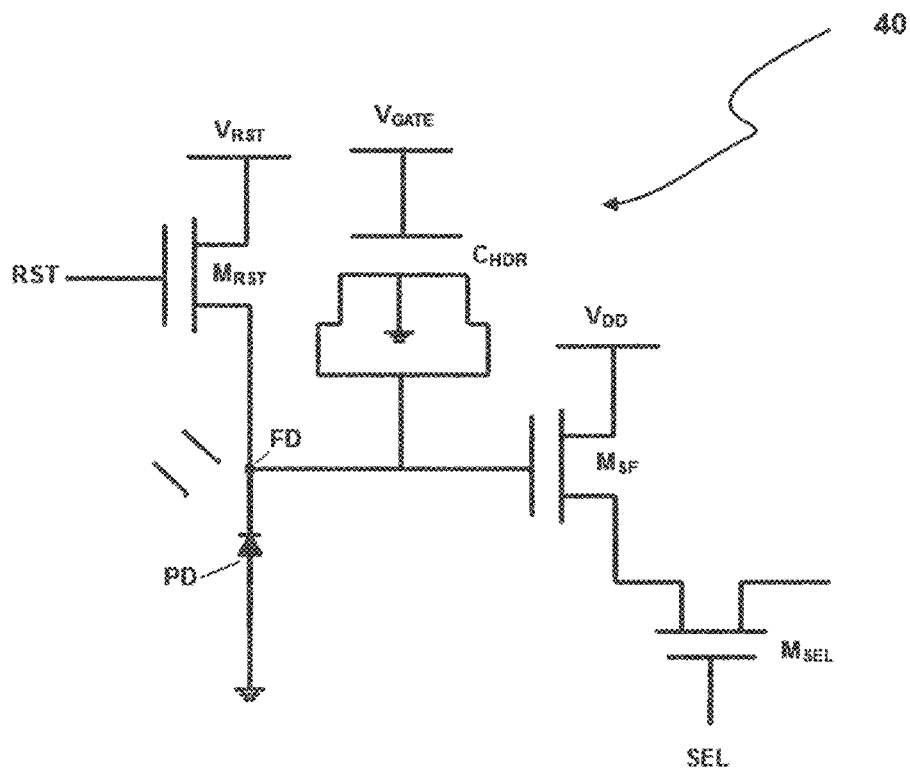
Figure 4

HIGH DYNAMIC RANGE PIXEL AND A METHOD FOR OPERATING IT

CROSS-REFERENCE TO RELATED APPLICATIONS

This application is a § 371 national stage entry of International Application No. PCT/EP2015/065372, filed Jul. 6, 2015, which claims priority to European Patent Application No. 14176159.3 filed Jul. 8, 2014, the entire contents of which are incorporated herein by reference.

TECHNICAL FIELD OF THE INVENTION

The invention relates to a High-Dynamic-Range (HDR) pixel and to a method for operating it. More particularly, the invention relates to a HDR pixel for performing Time-Of-Flight measurements and enabling to use different conversion gains, without destroying the charge information.

BACKGROUND OF THE INVENTION

An image sensor is a device capturing and converting an impinging electromagnetic radiation such as a light flux into an electronic signal. In digital imaging, Active-Pixel Sensors (APS) are mostly used. APS are image sensors consisting of an integrated circuit containing an array of pixel sensors, and wherein each pixel contains a photodiode and an active amplifier.

In an APS, the photodiode is sensitive to incident light. More precisely, the photodiode converts the incident light into charges which are accumulated during a given exposure time and then converted into an amplified voltage inside the pixel. This voltage is a continuous analog physical quantity which can be converted, thanks to an analog-to-digital converter, to a digital number representing the voltage amplitude.

One of the main problems of standard pixels is their potential saturation appearing when too strong incident light and/or too long exposure occur. In range imaging system using Time of Flight technologies (ToF), for example a Time-Of-Flight camera system 3, as illustrated in FIG. 1, providing distance information by analysing the Time of Flight and the phase of a pulsed light signal emitted 16 by a controlled light source 18 and reflected back 17 by objects from the scene 15, the saturation may occur when objects having standard reflective properties are closer from the distance range the imaging system 3 is calibrated for. The object reflects at that time too much from the emitted light and causes at least some pixels of the sensor to respond at their maximum value. The saturation may also occur when objects demonstrates specular reflective properties in the wavelength domain the pixels have been designed to be sensitive to, such as when a mirror in a scene reflects the entire incident light it receives onto the sensor imaging the scene, or when objects reflect and concentrate the incident light onto a portion of the sensor, or when an external light source emitting a strong illumination in the same wavelength domain the ToF camera has been designed for is illuminating the sensor.

When pixels are saturated, meaningful information about the scene is lost since the response provided is flattened at the maximum voltage value that can be provided; this leads to image artefacts or defects such as burned area, blooming effects in images. Moreover, certain applications, for instance the computation of depth information in ToF technology, uses phase shift based computations from a plurality of captures to derive a distance measurement. If pixel saturation occurs during integration time, the voltage at the detector nodes reaches a saturation level which corrupts the corresponding capture.

Another main problem of standard pixels is the fact that noise can be very strong. If the signal/noise ratio is small, then the noise is preponderant during the capture and useful information is lost.

An important figure of merit of an imaging sensor, taking into account both saturation and noise parameters, is the so-called Dynamic Range (DR), illustrated in FIG. 2. The Dynamic Range can be defined by the following ratio in decibels:

$$DR = 20 \log_{10} \frac{\text{signal maximum}}{\text{noise floor}}$$

For the purpose of increasing the Dynamic Range of image sensors, several techniques have been implemented. A first solution for increasing the Dynamic Range of image sensor has been to reduce the level of the noise floor, for instance by reducing the size of the sensors. This strategy suffers from the drawback of decreasing at the same time the saturation level of the sensor. This is the case A illustrated in FIG. 2.

Another approach for increasing the Dynamic Range of sensors is to increase the saturation level of the sensors. Several solutions of High Dynamic Range (HDR) or Wide Dynamic range (WDR) systems have been proposed in standard image sensors using several electronic circuits with addition of latches and/or memory point. Sensors have also been designed with techniques such as well adjusting, multiple captures or spatially varying exposure. Moreover, extra logic circuitry has been added per CMOS APS, but this reduces the effective sensitive area of sensor and results in a very low fill factor that do not comply with efficient ToF imaging requirements.

Another solution consists in using circuits with logarithmic pixels. Such pixel circuits generate a voltage level that is a logarithmic function of the amount of light striking a pixel. This is different from most CMOS or CCD type image sensors that use a linear type of pixels. Nevertheless, the use of logarithmic pixels complicates highly the post processing to compute required data, as depth information for instance, since it introduces well known compression issues and request also extra processing computations.

One of these solutions, based on the increase of the saturation level, is illustrated by FIG. 3. An extra capacitor $C_{PA}$ is used, on which the charges generated during the integration time in the photodiode PD can be transferred. The main drawback of this method is that, once transferred on the extra capacitor, only one read-out cycle is possible. It is not possible to read-out several times the data contained on the extra capacitor, and to adapt the conversion gain to be used.

A solution remains to be proposed for increasing the Dynamic Range of Time-Of-Flight sensors, while allowing non-destructive multiple read-outs of the same charge information using different conversion gains.

SUMMARY OF THE INVENTION

The present invention relates to a High Dynamic Range pixel according to claim 1.

By intrinsic capacitance, it is meant that this intrinsic capacitance, which is also the parasitic capacitance $C_P$, is not an extra capacitance added to the circuit, but is the sum of all the parasitic capacitances linked to the electronic compounds of the circuits, i.e. the sum of the capacitances originated from at least one of the photo-sensitive element, the detector node, the reset switch, the buffer amplifier and the selecting transistor. By definition, this intrinsic capacitance cannot be suppressed alone.

Thanks to the invention, it is possible also to choose the best conversion gain to be used. Even if the charges are stored on the big capacitance first, it is possible to transfer them into the parasitic capacitance, for obtaining a high conversion gain.

Preferably, the dual-mode capacitance ($C_{HAR}$) is a MOS capacitance operable for storing minority carriers in inversion mode and for destoring the minority carriers in accumulation mode. The fact of using a MOS capacitance enables to transfer charge in both directions, from the parasitic capacitance to the MOS capacitance and from the MOS capacitance to the parasitic capacitance. This is not possible when using a standard one-mode capacitance.

Advantageously, the photo-sensitive element is a pinned photodiode enabling to deplete completely the photodiode during a charge transfer step, and thus, to reduce the read-out noise.

More advantageously, the HDR pixel is used for performing Time-Of-Flight measurements. The fact of obtaining, with only one integration time, data with both low and high conversion gain is extremely interesting for Time-Of-Flight measurements, because the same charge information can be output twice in a non-destructive way. This is advantageous for Time-Of-Flight measurements where several correlations need to be combined mathematically to calculate the distance. The different correlations can be acquired in parallel during the same exposure or sequentially using consecutive exposures. The invention offers a way to measure the correlations of each exposure multiple times using different conversion gains, without destroying the charge information.

The present invention also relates to a method for operating a High Dynamic Range pixel according to claim 7.

Advantageously, the method enables to perform measurements with a low reset-noise, because the reset of the photo-sensitive element is carried out while the dual-mode capacitance is in accumulation mode.

The method is particularly advantageous for Time-Of-Flight applications. Because multiple consistent datasets are available, there is no situation whereby the time-of-flight information needs to be calculated with correlation data originating from different conversion gains. Hence, there is no need to calibrate the different conversion gains with respect to each other, which is a huge advantage of the present invention with respect to for example logarithmic, lin-log or piece-wise linear pixel implementations.

Other advantages and novel features of the invention will become more apparent from the following detailed description when taken in conjunction with the accompanying drawings.

BRIEF DESCRIPTION OF THE DRAWINGS

The present invention shall be better understood in light of the following description and the accompanying drawings.

FIG. 3 illustrates a standard 3T-pixel configuration as implemented in prior art;

FIG. 4 illustrates a pixel configuration according to an embodiment of the invention;

Advantages and novel features of the invention will become more apparent from the following detailed description when taken in conjunction with the accompanying drawing.

DESCRIPTION OF THE INVENTION

FIG. 4 illustrates a pixel configuration according to an embodiment of the invention.

The pixel 40 comprises:
- a photosensitive element PD, for instance a photodiode, for generating charges in response to impinging light; a pinned photodiode could be used also;
- a detector node FD, which is the node attached to the cathode of the photodiode in case there is no transfer gate, or a detector node FD which can be connected to the PD element by means of a transfer gate, not represented;
- a reset transistor $M_{RST}$ responsive to a control signal RST and operable to initialise the photosensitive element PD to a known voltage ($V_{RST}$), or to reset the element FD to a known voltage while depleting completely the pinned photodiode, if a pinned photodiode is used;
- an amplifier transistor $M_{SF}$, for instance a source-follower, responsive to a VDD signal and operable to allow the pixel voltage to be observed without removing the accumulated charge; the voltage at the detector node FD is translated towards the pixel output via this transistor used as an amplifier;
- a selecting transistor $M_{SEL}$ responsive to a SEL signal and operable to select the pixel during a read out process;
- a small intrinsic or parasitic capacitance $C_P$, corresponding to the sum of all the parasitic capacitances of the circuit, mainly the intrinsic photodiode capacitance and the capacitances associated to the amplifier and reset transistors;
- a dual-mode capacitance, for instance a Metal-Oxide-Semiconductor (MOS) capacitor $C_{HDR}$.

Figure 1:
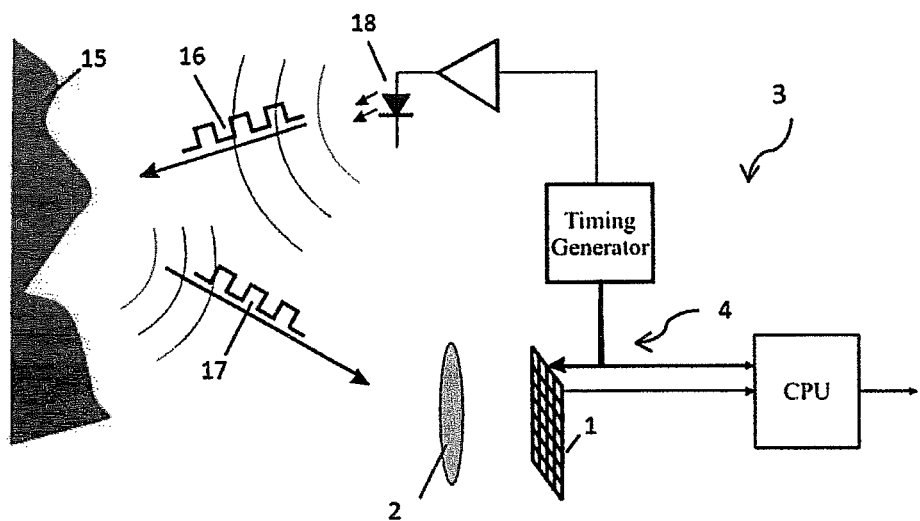
FIG. 1 illustrates the basic operational principle of a TOF camera system.
Figure 2:
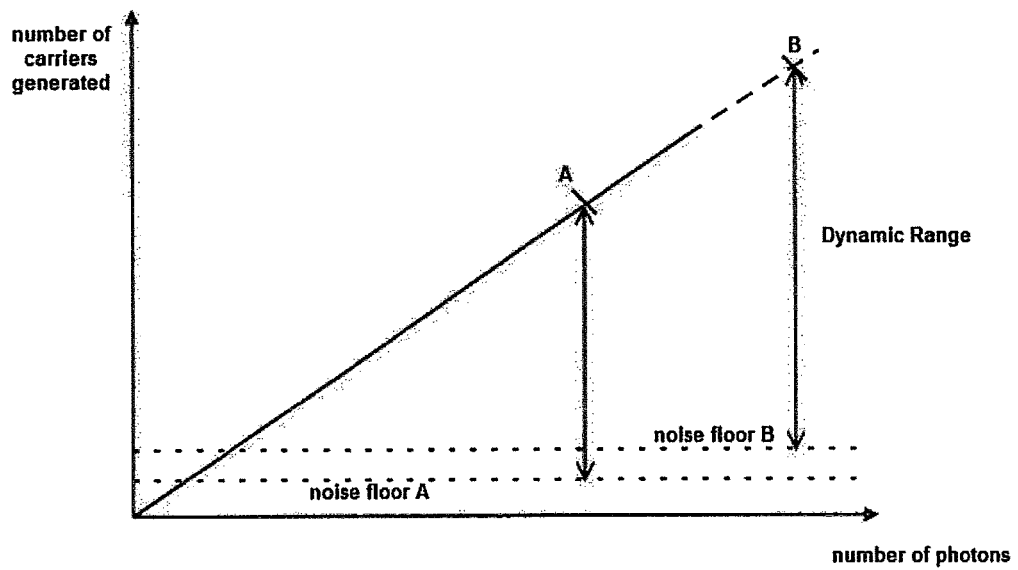
FIG. 2 illustrates the definition of High Dynamic Range.
Figure 5:
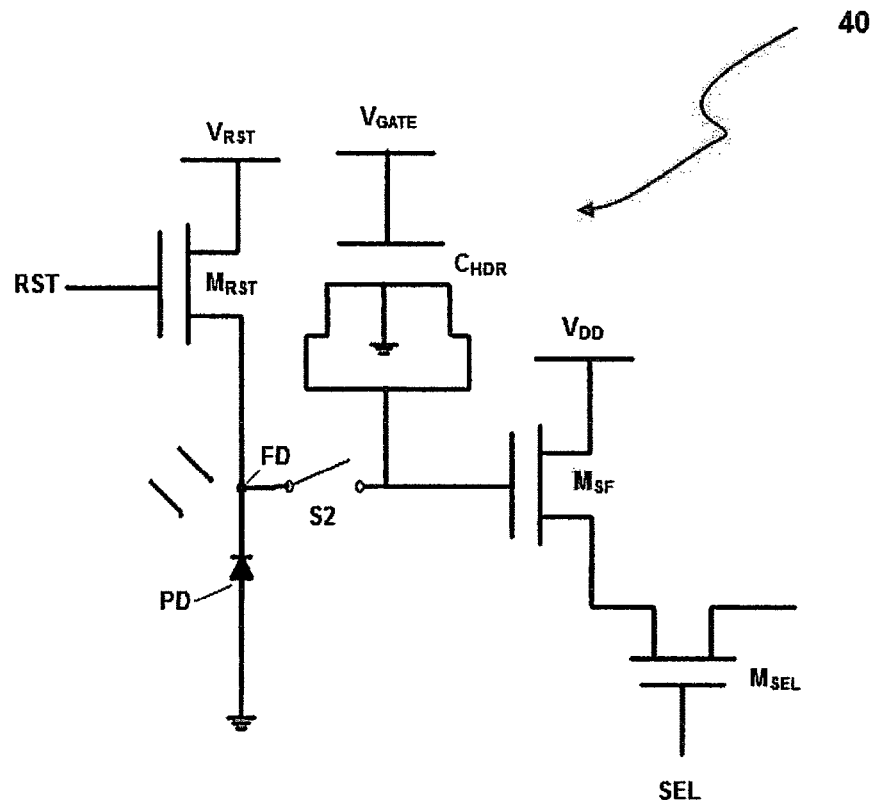
FIG. 5 illustrates a pixel configuration according to another embodiment of the invention.

In one possible embodiment, an additional switch S2 is added to the pixel and is connected between the CMOS capacitor $C_{HDR}$ and the detector node FD, as illustrated in FIG. 5.

The value of the parasitic intrinsic capacitance $C_P$ is typically about 10 fF. This small capacitance enables to integrate a small amount of charges, but suffers from a low saturation level. Its conversion gain, i.e. the ratio "voltage generated by a number of generated electrons/number of generated electrons", is high and enables to achieve a high sensitivity in conditions of darkness.

The MOS capacitor $C_{HDR}$ is made of a semiconductor body or substrate, an insulator film, a metal electrode called a gate, and one or two ohmic contacts for contacting the semiconductor body. It should be understood that a standard CMOS transistor comprises typically two ohmic regions called sources and drain contacting the semiconductor body. In the present invention, the source and drain can be connected, as represented in FIG. 4 and FIG. 5, or only one zone can be designed, as in FIG. 8. In the present invention, if two ohmic contacts are designed, then the MOS capacitor $C_{HDR}$ is arranged such that the semiconductor side, i.e. the source and drain of the MOS capacitor, is connected to the detection node FD of the photodetector PD.

The conversion gain of the MOS capacitor $C_{HDR}$ is relatively small. This big capacitance is particularly useful in bright condition, as its saturation level is high.

Figure 6:
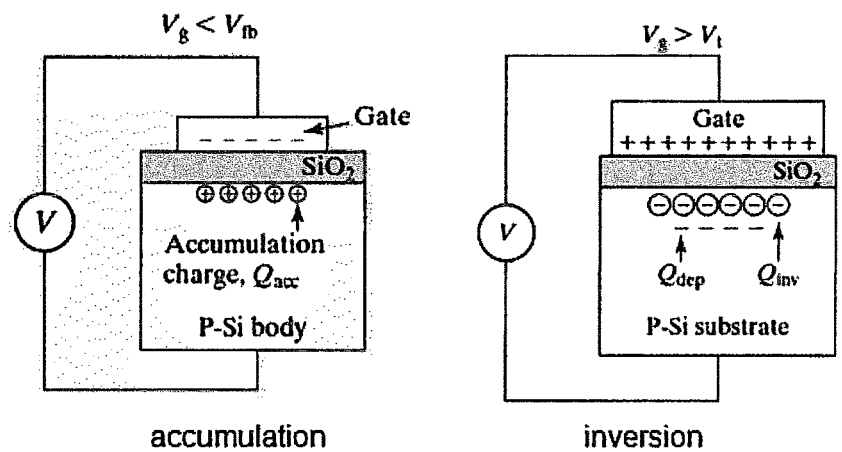
FIG. 6 illustrates the well-known device physics of a MOS capacitor, wherein the semiconductor layer is a p doped layer.

FIG. 6 illustrates the well-known device physics of a MOS capacitor, wherein the semiconductor layer is a p-doped layer:
If the voltage $V_g$ applied to the gate is smaller than the so-called flat-band voltage $V_{fb}$, then there are a large number of holes at or near the surface semiconductor/oxide. They form an accumulation layer and the capacitance is in accumulation mode.
If the voltage $V_g$ applied to the gate is greater than the so-called threshold voltage $V_T$, then there is now an inversion layer, which is filled with inversion electrons. It's the inversion mode.

It should be understood that the invention is presented with a MOS capacitance being p-doped and that, in the following, the minority carriers are electrons, but the invention is not limited thereto and could be implemented by the one skilled in the art with an n-doped capacitance and minority carriers being holes.

Figure 7:
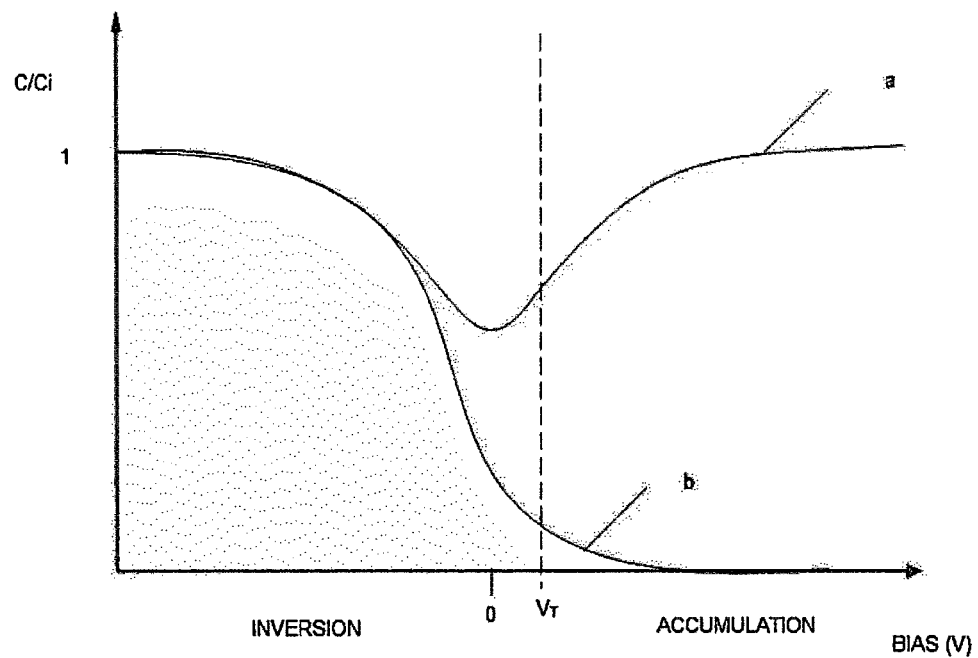
FIG. 7 shows the capacitive behaviour of a MOS capacitor as a function of gate bias.

FIG. 7 shows the capacitive behaviour of a MOS capacitor $C_{HDR}$ as a function of gate bias. Line (a) plots the capacitance seen on the gate at low frequencies versus bias conditions, while line (b) plots the capacitance seen from the semiconductor contact, doped in the same polarity as the inversion layer of the MOS.

Seen from the gate the MOS capacitor has limited tunability because at low frequency the gate capacitances in inversion and accumulation are equal (FIG. 7, a). However, in inversion the charges used on the other side of the capacitor, i.e. on the semiconductor side, are minority carriers, while on accumulation the charges are majority carriers. This means that when only looking at minority carriers, i.e. the minority carriers integrated during the integration time by the photodiode PD, no charges can be accumulated in the capacitor in accumulation. This means that, for minority carriers, there is no capacitor when the MOS capacitor is in accumulation (FIG. 7, b).

When the gate voltage of the structure of FIG. 4 or FIG. 5 corresponds to the inversion mode of the capacitor, the capacitor can now accept minority carriers from the semiconductor contact and can act as a capacitor for those charges, in this case electrons. When the gate voltage corresponds to the accumulation mode, the minority carriers which were present in the channel are now pushed into the semiconductor region again, altering the capacitance on this node without modifying the charge information. This way it is possible to switch between a mode with high capacitance for minority carriers and low conversion gain (MOS in inversion) and a mode with low capacitance and high conversion gain (MOS in accumulation).

The use of the dual-mode capacitance MOS $C_{HDR}$ enables the transfer of charges:
from the parasitic capacitance $C_P$ to the big capacitance $C_{HDR}$ by opening the switch S2 and applying a gate voltage $V_g$ such that the capacitance $C_{HDR}$ operates in inversion mode, and such that the total capacitance seen by the minority carriers $C_T$ is the sum of $C_P$ and $C_{HDR}$; and
from the big capacitance $C_{HDR}$ to the parasitic capacitance $C_P$ by applying a gate voltage $V_g$ such as the capacitance $C_{HDR}$ operates in accumulation mode and pushes the minority carriers away, towards the parasitic capacitance, such that the total capacitance seen by the minority carriers $C_T$ is only $C_P$.

The pixel 40 of the instant invention, comprising this dual-mode MOS capacitance is particularly interesting in Time-Of-Flight camera system. Preferably, the pixel 40 of the present invention is operable for performing Time-Of-Flight measurement. The pixel 40 can be, for instance, a pixel of a Current-Assisted Phototonic Demodulator for performing Time-Of-Flight correlation measurements, but the invention is not limited thereto. Thanks to the dual-mode MOS capacitance, the same charge information can be output twice in a non-destructive way, which is advantageous for Time-Of-Flight measurements where several correlations need to be combined mathematically to calculate the distance. The different correlations can be acquired in parallel during the same exposure or sequentially using consecutive exposures. The invention offers a way to measure the correlations of each exposure multiple times using different conversion gains, without destroying the charge information. This is important for time-of-flight as, in order to be able to mathematically combine the correlation data, the correlation dataset needs to be consistent and measured using the same conversion gain. Now, with the present invention multiple datasets are available which are consistent. Each correlation datapoint within a set is measured using the same conversion gain, and several sets are available whereby the sets are measured with different conversion gains. This means that for low-intensity measurements, where the charge collected is low, the dataset with high conversion gain can be used (i.e. the parasitic capacitance $C_P$), while for high-intensity measurements the dataset with low conversion gain can be used (i.e. the MOS capacitance $C_{HDR}$), because the information when measured on high-conversion gain will have saturated.

Figure 8:
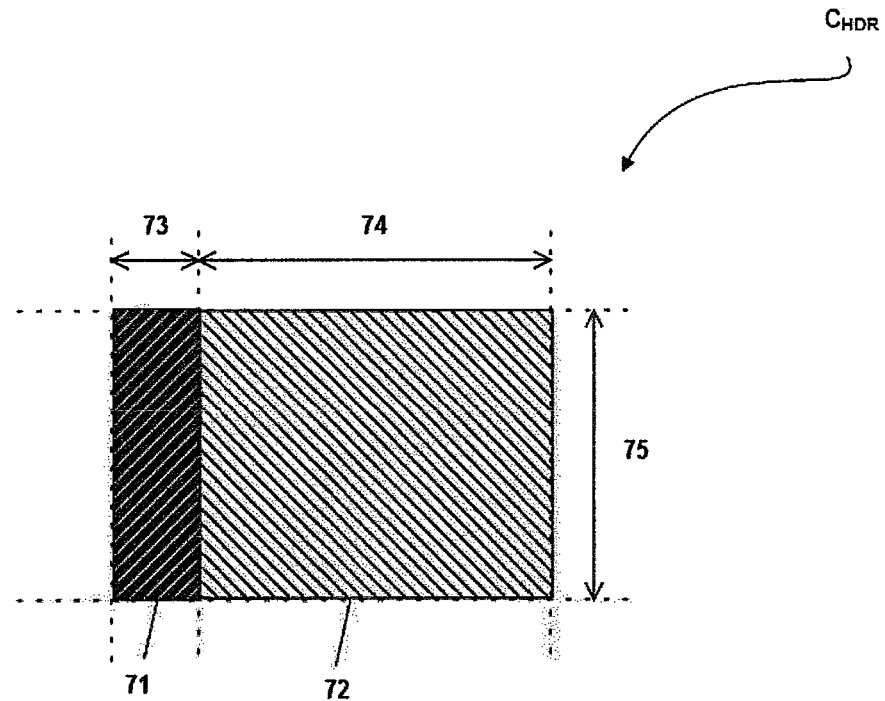
FIG. 8 is a top-view of the MOS capacitor $C_{HDR}$ according to an embodiment of the invention.

A top-view of the MOS capacitor $C_{HDR}$ is provided on FIG. 8. Region 72 is a top-view of the gate of the CMOS capacitance, below which the insulation and semiconductor layers are. Region 71 is an ohmic contact contacting the semiconductor layer, for allowing the minority carriers to go in or out the MOS capacitor. In FIG. 8, only one ohmic contact 71 is represented, but the invention could comprise 2 ohmic contacts. It should be understood that a standard CMOS transistor comprises typically two ohmic regions called sources and drain. In the present invention, the sources and drain can be connected, as represented in FIG. 4 and FIG. 5, or only one zone can be designed, as in FIG. 8. Only one contact ohmic is required for allowing the minority carriers to go in or out the MOS capacitor.

The value of the additional capacitance $C_{HDR}$ that can be switched on and off is proportional to the gate unit capacitance, typically in the order of 4 fF/µm², is proportional to the width of the MOS capacitor 75 and the length of the MOS capacitor 74. However, the addition of the structure also adds parasitic capacitance which is proportional to the width 75, to the contact length 73—which is technology dependent and must be minimized, and to the junction capacitance of this active region 71, also technology dependent. In order to have a high modulation of capacitance on the node FD, one must minimize the parasitic capacitance $C_P$ (which cannot be switched) by minimizing the width of the MOS structure 75 and maximize the length of the MOS structure 74. Modulation ratios of 6:1 up to 10:1 can be achieved by optimizing the length and width 74 and 75, respectively, offering a dynamic range improvement of about 20 dB. Other more exotic implementations of the MOS structure are possible as well, such as a single drain/source contact surrounded by a circular gate, etc.

Figure 9:
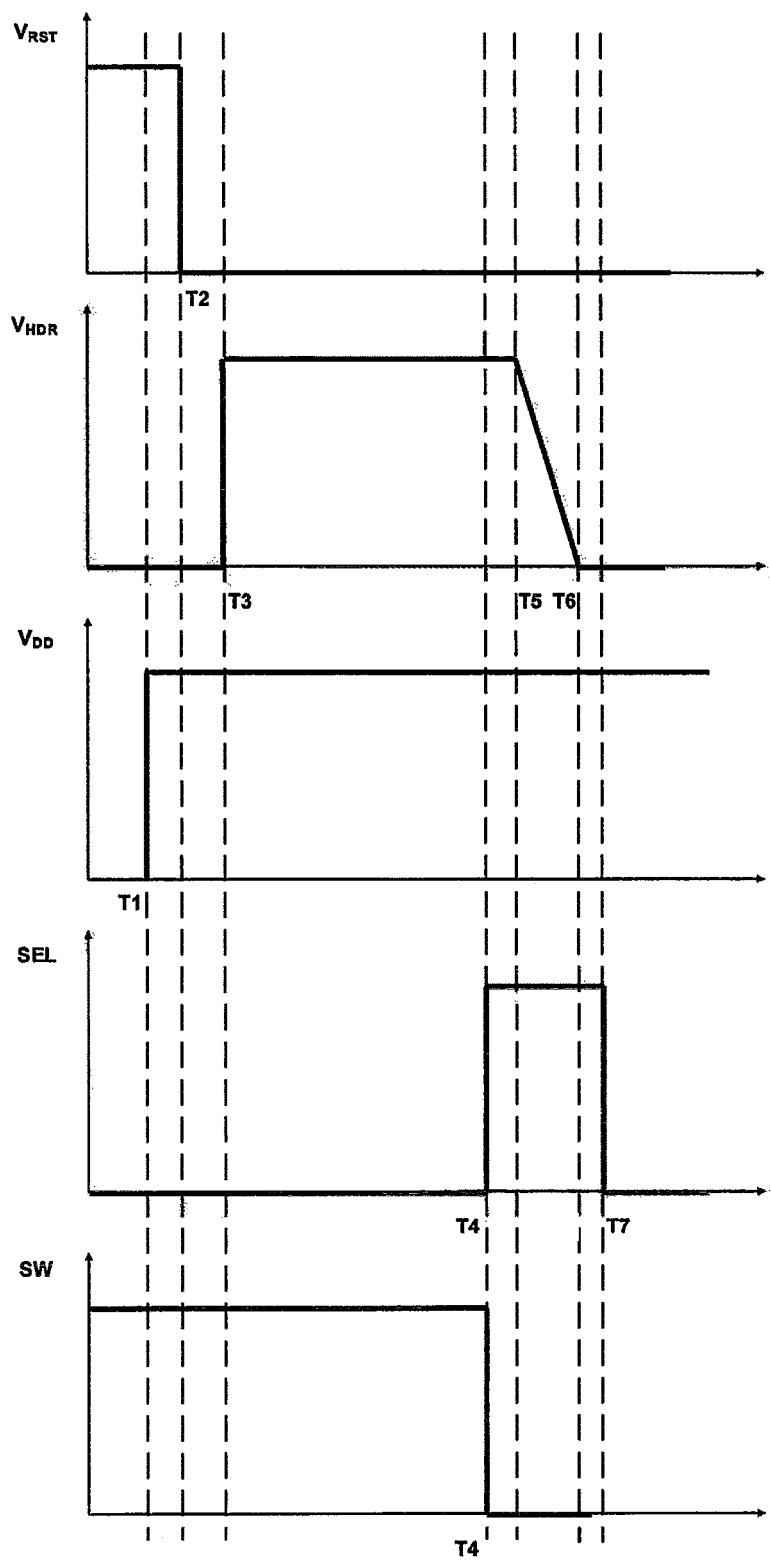
FIG. 9 shows typical waveforms to control the pixel, according to an embodiment of the invention.

FIG. 9 shows typical waveforms to control the pixel, this illustrating the method of the invention.

At time T1, the source-follower $M_{SF}$ is reset to the $V_{DD}$ value. Then, a reset pulse is given to the gate of the transistor $M_{RST}$ until time T2. During reset, the MOS capacitor $C_{HDR}$ is kept in accumulation, with $V_{HDR}$ low, meaning that for the minority carriers there is only the parasitic capacitance $C_P$. Hence, the kTC noise created by reset is only defined by the parasitic capacitance $C_P$, being the sum of the parasitic capacitance of the detection diode PD in parallel with the parasitic capacitance remaining on node FD (for example input capacitance of the amplifier $M_{SF}$).

After reset, the MOS is biased in weak inversion, at time T3, and the integration time starts. For any charge accumulated on node FD, the additional MOS capacitor $C_{HDR}$ will be seen, so the integration of charge information happens during exposure on the total capacitance $C_T$ being the sum of $C_P$ and $C_{HDR}$.

At time T4, the exposure time is ended and the information is sampled. The charge information is read out on the full capacitance $C_T$, meaning that a low conversion gain is used.

After this first read-out operation, the MOS capacitor $C_{HDR}$ is switched in accumulation (or at least flat band) with a $V_{HDR}$ level low, between times T5 and T6, and the minority carriers previously present in the inversion layer are pushed back into the semiconductor contact 71 connected to node FD. Preferably, times T5 and T6 are chosen such that the change between inversion and accumulation mode is slow and not abrupt, for ensuring a better charge transfer. Times T5 and T6 could also be fused in one single time. The same charge information can then be read on the low capacitance $C_P$, meaning that a high conversion gain is used during this second read-out operation.

If the data read-out in this high-conversion gain mode is saturated, then the time-of-flight calculation can be done using the data acquired in the low-conversion gain mode, at time T3, and a choice can be done.

In one embodiment, when a switch S2 is used, as represented in FIG. 5, then the switch can be maintained closed until time T4 (signal SW). Then, the switch can be opened for enabling a complete transfer of charge during the first read-out step.

The invention can also be used in a global shutter pixel approach by implementing a transfer gate between the PD element and the FD element. The dual-mode capacitance is again connected to the FD element. In case the PD element is not a pinned photodiode, when the transfer gate is conducting, the collected carriers are distributed between PD and FD to have equal potential on both nodes. It is thus advantageous to have a big capacitance on FD, so the majority of the collected carriers will be stored on the FD side. When the transfer gate is released the situation is frozen. Now the electrons on the FD node can be read first in low conversion gain mode and then in high conversion gain mode by bringing the MOS structure back in accumulation. In doing so we have achieved better charge transfer from PD to FD with respect to normal global shutter mode. The amount of charges lost is without the dual-mode capacitor $(C_{PD}/(C_{PD}+C_{FD}))$ which typically approaches ½, while in the present invention the amount of charges lost in global shutter operation is reduced to $(C_{PD}/(C_{PD}+C_{FD}+C_{HDR}))$ while maintaining approximately the original FD conversion gain in high-conversion gain mode.

Figure 10:
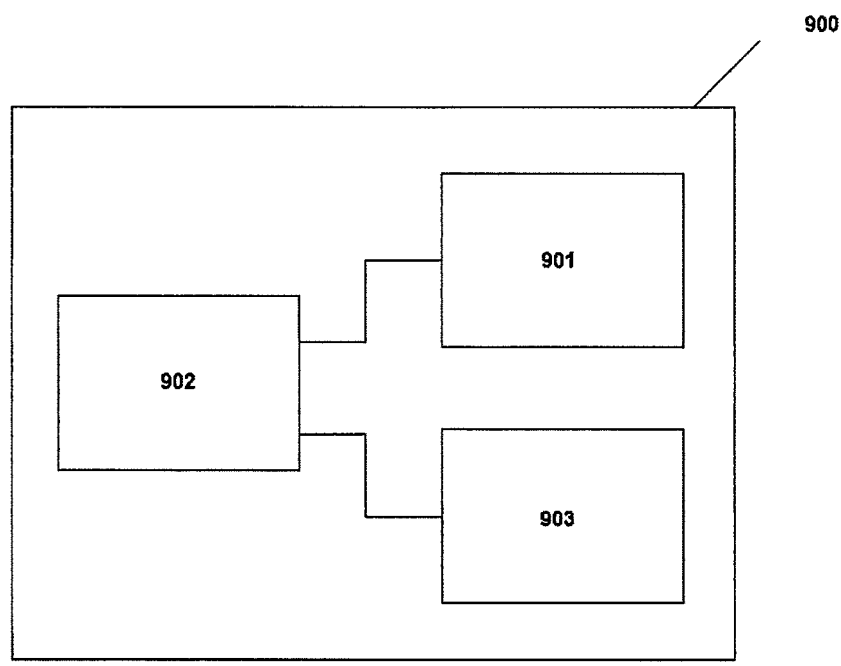
FIG. 10 shows an implementation of a Time-Of-Flight imaging system according to an embodiment of the invention.

FIG. 10 shows an implementation of a Time-Of-Flight imaging system 900 using the dynamic range improvement from this invention. A pixel array 901, comprising an array of pixels 40 according to any of the embodiments from this invention, is connected to a read-out module 902 which can be an ADC, an analog output buffer, a set of parallel ADCs etc, and a timing module 903 which controls both pixel array 901 and readout module 902 to read out each pixel in multiple modes.

The invention claimed is:

1. A Time-Of-Flight imaging system, comprising:
   an array of high-dynamic range (HDR) pixels, each HDR pixel in the array comprising:
      a photo-sensitive element for generating majority and minority carriers in response to incident radiation during an integration time;
      a detector node connected to the photo-sensitive element;
      a reset switch connected to the detector node for resetting the detector node to a predetermined voltage;
      a buffer amplifier having an input node connected to the detector node;
      a selecting transistor operable to select said pixel during a read out process; and
   a dual-mode capacitance having an input connected to the detector node and being operable in storing and destoring modes, for storing the generated minority carriers while being in the storing mode and destoring the stored minority carriers into a parasitic capacitance of one or more of the photo-sensitive element, the detector node, the reset switch, and the buffer amplifier, while being in the destoring mode; and
   a controller configured to control operation of the HDR pixels in the array to:
   perform a first readout operation at a first time using a low conversion gain in which the minority carriers were stored in the dual model capacitance and the intrinsic parasitic capacitance during the storing mode;
   perform a second readout operation at a second time using a high conversion gain in which the minority carriers were stored only using in intrinsic parasitic capacitance during the destoring mode;
   determine based on data readout during the second readout operation whether the HDR pixel was saturated; and
   perform a Time-Of-Flight measurement using data readout during the first readout operation when it is determined that the data readout during the second readout operation was saturated.

2. The Time-Of-Flight imaging system of claim 1, wherein the dual mode capacitance is a MOS capacitance operable for storing minority carriers in an inversion mode and for destoring the minority carriers in an accumulation mode.

3. The Time-Of-Flight imaging system of claim 1, wherein the photodiode is a pinned photodiode.

4. The Time-Of-Flight imaging system of claim 1, further comprising a transfer gate connected between the photo-sensitive element and the detector node.

5. The Time-Of-Flight imaging system of claim 1, wherein performing the Time-Of-Flight measurement comprises performing a Time-of-Flight correlation measurement, and wherein the controller is further configured to control operation of the HDR pixels in the array to:
capture multiple exposures, wherein for each exposure, the first and second readout operations are performed for respective, low and high conversion gains, and
wherein performing the Time-Of-Flight correlation measurement comprises selectively using data from the second readout operation for low-intensity exposures and selectively using data from the first readout operation for high-intensity exposures.

6. A method for operating a Time-Of-Flight imaging system to perform a Time-Of-Flight measurements, the Time-Of-Flight imaging system including an array of high-dynamic range (HDR) pixels, each HDR pixel in the array comprising a photo-sensitive element, a detector node connected to the detector node, a reset switch connected to the detector node for resetting the detector node to a predetermined voltage, a buffer amplifier having an input node connected to the detector node, a selecting transistor operable to select said pixel during a read out process, and a dual-mode capacitance having an input connected to the detector node, the method comprising:
resetting the photo-sensitive while maintaining the dual-mode capacitance in a destoring mode in which minority carriers stored in the dual-mode capacitance are transferred to a parasitic capacitance of one or more of the photo-sensitive element, the detector node, the reset switch, and the buffer amplifier;
integrating the minority carriers in response to incident radiation while maintaining the dual-mode capacitance in a storing mode for storing the minority carriers on both the parasitic capacitance and the dual-mode capacitance;
reading-out first pixel data corresponding to the minority carriers stored on both the parasitic capacitance and the dual-mode capacitance during the storing mode;
switching the dual-mode capacitance into the destoring mode to transfer the minority carriers stored in the dual-mode capacitance into the parasitic capacitance;
reading-out second pixel data corresponding to the minority carriers stored only on the parasitic capacitance during the destoring mode;
determining based on the second pixel data whether the HDR pixel was saturated; and
performing the Time-Of-Flight measurement using the first pixel data when it is determined that the second pixel data was saturated.

7. The method of claim 6, further comprising:
controlling the Time-Of-Flight imaging system to capture multiple exposures, wherein for each exposure, the first and second pixel data is read out, and
wherein performing the Time-Of-Flight measurement comprises selectively using data from the second readout operation for low-intensity exposures and selectively using data from the first readout operation for high-intensity exposures.

* * * * *